UNITED STATES PATENT OFFICE.

HARRY T. BELLAMY, OF OAK PARK, AND BURTON T. SWEELY, OF CICERO, ILLINOIS, ASSIGNORS TO WESTERN ELECTRIC COMPANY, INCORPORATED, OF NEW YORK, N. Y., A CORPORATION OF NEW YORK.

RESISTANCE MATERIAL.

1,346,874.   Specification of Letters Patent.   Patented July 20, 1920.

No Drawing.   Application filed November 16, 1918. Serial No. 262,852.

*To all whom it may concern:*

Be it known that we, HARRY T. BELLAMY and BURTON T. SWEELY, citizens of the United States, residing at Oak Park, in the county of Cook and State of Illinois, and Cicero, in the county of Cook and State of Illinois, respectively, have invented certain new and useful Improvements in Resistance Material, of which the following is a full, clear, concise, and exact description.

This invention relates to resistance material, and more particularly to a high resistance insulating material for use with electrically controlled heating elements.
The object of this invention is to provide an insulating compound which will have a high resistance at high temperatures and one which is capable of being readily formed or worked into any desired shape.
In accordance with the general features of this invention there is provided a ceramic composition comprising a naturally occurring earth such as magnesium silicate, silica sand, ball clay, and sufficient amount of glass to bind the whole into a homogeneous mass when fired at a temperature of 1650° F.

Another feature of this invention relates to the glass binder the composition of which is such that it will be free from elements which are likely to act as electrolytes when a silicate body containing them is raised to a temperature to which insulating bodies of this class are likely to be subjected. Such a glass results from a composition of whiting, barium carbonate, clay, boric acid, and quartz.

It is well known that all artificially compounded porcelains and similar silicates as well as the natural occurring silicates which are used at present as insulators for high temperature electrical apparatus suffer a sharp decrease in resistance with each increase in temperature. It is also known that certain substances have a peculiar property of conducting electricity and acting as electrolytes when a silicate body containing them is raised in temperature, the activity becoming more pronounced upon increasing either the temperature or the amount of electrolyte present.

Since it is necessary that a resistance material of this class be formed or shaped to adapt it to the heating element, it is important that such a compound should be plastic when wet and capable of retaining the shape imparted to it in the plastic condition after it has been dried and baked. All natural occurring silicates such as clays which possess this property of plasticity are, if free from objectionable electrolytes, either too refractory to mature at a sufficiently low temperature or, if fusible enough to mature at approximately 1650° F., contain large quantities of electrolytes which become active at the temperature which results in the use of the heating element. Moreover, all of the known commercial raw materials free from electrolytically active substances which possess the desired plasticity are too refractory to mature to a hard, strong body at the desired temperature, and it becomes necessary, therefore, to combine some binding material with a plastic refractory body in order to produce a composition which will be free from electrolytes which are active at the temperatures to which the composition is raised, which will be plastic when wet and retain its shape when dry, and which will mature to a hard, strong body at a comparatively low temperature.

In accordance with this invention the insulating body used in the heating element is compounded of talc (which is a natural occurring mineral composed principally of magnesium silicate); silica sand, enough clay as ball clay to give the body the required plasticity, and sufficient amount of glass to bind the whole into a homogeneous mass when fired at 1650° F.

Since certain of the metallic oxids and alkalis used for fluxes in glasses and glazes, such as the oxids of lead, tin, zinc, sodium, potassium, etc., are prone to act as electrolytes when the body containing them is raised to a high temperature, it is necessary to provide a composition for the binder which will be free from such substances which have this electrolytic action when raised to a high temperature. The elements best known which do not seem to become electrolytically active when combined as bases with silica at approximately 1700° F. are calcium, barium and magnesium. A compound which satisfactorily meets the requirements as a binder for the resistance material is composed of

| | |
|---|---|
| Whiting | 10.5 per cent. |
| Barium carbonate | 20.7 " " |
| Clay | 2.7 " " |
| Boric acid | 52.2 " " |
| Quartz | 13.9 " " |

The above composition when melted to a glass and re-heated to 1650° F. has an infinite resistance so far as can be determined. The composition of the resistance body in its final form comprises

| | |
|---|---|
| Powdered talc | 50 per cent. |
| Quartz sand | 35 " " |
| Clay | 5 " " |
| Powdered glass of the above formula | 10 " " |

The artificially compounded silicate containing the above elements possesses a very high resistance when hot and differs from other known artificially compounded or natural occurring silicates in use as insulating compounds at the present time.

It is also believed that the use of a low melting glass combined with highly refractory materials is new and novel. The action of this glass used in the manner described is entirely different from the action of the usual fluxes in artificially compounded silicates in which some such minerals as feldspar, whiting, etc., are added to the body as fluxes, the resulting degree of hardness and strength of the finished body being directly proportional to the temperature at which the eutectic mixture between the various components forms, the length of time required to form sufficient of these eutectic mixtures to bond the body, and the temperature and length of time over which the body is subjected to heat treatment. In the case of the glass binder of this invention the eutectic relation has little or no effect. Sufficient heat treatment to melt the glass being accorded, the resultant body will be as hard and strong as the glass, since it fuses around and cements together the different refractory components of the body and does not depend upon a partial fusion of these components to create the bond.

What is claimed is:

1. A compound having a high electrical resistance at high temperatures and comprising talc, silica sand, ball clay, and a glass binder.

2. A compound having a high electrical resistance at high temperatures comprising talc, silica sand, ball clay, and a non-electrolytic glass binder.

3. A compound having a high electrical resistance at high temperatures and comprising magnesium silicate, silica sand, sufficient clay to render it plastic, and sufficient glass to bind the whole into a homogeneous mass when fired at a temperature of approximately 1650° F.

4. A compound having a high electrical resistance at high temperatures and comprising approximately 50% magnesium silicate, 35% quartz sand, 5% clay, and 10% powdered glass to bind the whole into a homogeneous mass when fired at 1650° F.

5. A compound having high electrical resistance at high temperatures and comprising talc, silica sand, a plastic clay, and a binder of non-electrolytic glass comprising whiting, barium carbonate, clay, boric acid, and quartz.

6. A compound having high electrical resistance at high temperatures comprising magnesium silicate, silica sand, a plastic clay, and a binder of non-electrolytic glass comprising whiting, barium carbonate, clay, boric acid, and quartz.

7. A compound having high electrical resistance at high temperatures and comprising 50% powdered talc, 35% quartz sand, 5% clay, and approximately 10% powdered glass comprising whiting, barium carbonate, clay, boric acid, and quartz.

8. A compound having high electrical resistance at high temperatures and comprising 50% powdered talc, 35% quartz sand, 5% clay, and approximately 10% powdered glass comprising 10% whiting, 21% barium carbonate, 3% clay, 52% boric acid, and 14% quartz.

In witness whereof, we hereunto subscribe our names this 25 day of Oct. A. D., 1918.

HARRY T. BELLAMY.
BURTON T. SWEELY.